United States Patent
Lu et al.

(10) Patent No.: US 6,789,400 B2
(45) Date of Patent: Sep. 14, 2004

(54) CAP ASSEMBLY AND OPTICAL FIBER COOLING PROCESS

(75) Inventors: Yaping Lu, Scotch Plains, NJ (US); Arthur I. Shirley, Hillsborough, NJ (US); Neeraj Saxena, Murray Hill, NJ (US); Paul A. Propsner, Trenton, NJ (US); Lip Yee Lee, Singapore (SG)

(73) Assignee: The BOC Group, Inc., Murray Hill, NJ (US)

(*) Notice: Subject to any disclaimer, the term of this patent is extended or adjusted under 35 U.S.C. 154(b) by 292 days.

(21) Appl. No.: 09/998,288

(22) Filed: Nov. 30, 2001

(65) Prior Publication Data

US 2003/0101773 A1 Jun. 5, 2003

(51) Int. Cl.[7] .......................... C03B 25/10; C03B 37/00; F28C 3/00
(52) U.S. Cl. .............................. 65/434; 65/510; 65/512; 165/72; 165/75
(58) Field of Search ......................... 65/434, 435, 510, 65/424, 430, 511, 512, 384, 488, 537; 62/63, 265, 322, 292, 475; 264/1.24, 2.7; 165/70–75, 104.31, 104.35, 121, 177; 63/62

(56) References Cited

U.S. PATENT DOCUMENTS

| | | | |
|---|---|---|---|
| 4,437,870 A | 3/1984 | Miller | |
| 4,514,205 A | * 4/1985 | Darcangelo et al. | 65/491 |
| 4,594,088 A | 6/1986 | Paek et al. | |
| 4,659,354 A | * 4/1987 | Roba | 65/423 |
| 4,664,689 A | 5/1987 | Davis | |
| 4,838,918 A | 6/1989 | Vaughan et al. | |
| 4,894,078 A | 1/1990 | Takimoto et al. | |
| 4,913,715 A | 4/1990 | Jochem et al. | |
| 5,160,359 A | 11/1992 | Strackenbrock et al. | |
| 5,314,515 A | 5/1994 | Cain | |
| 5,377,491 A | * 1/1995 | Schulte | 62/63 |
| 5,452,583 A | 9/1995 | Schulte | |
| 5,897,682 A | 4/1999 | Koaizawa et al. | |
| 6,092,391 A | 7/2000 | Chludzinski | |
| 6,125,638 A | * 10/2000 | Ji et al. | 62/63 |
| 6,142,343 A | 11/2000 | Wade et al. | |
| 6,142,393 A | 11/2000 | Kotyk | |
| 6,223,919 B1 | 5/2001 | Kuehn | |

FOREIGN PATENT DOCUMENTS

| EP | 0 079 186 | * 5/1983 | C03B/37/025 |
|---|---|---|---|
| WO | WO 99/26891 | * 6/1999 | C03B/37/027 |

* cited by examiner

*Primary Examiner*—Steven P. Griffin
*Assistant Examiner*—Eric Hug
(74) *Attorney, Agent, or Firm*—Philip H. Von Neida (57) ABSTRACT

A cap assembly for collecting cooling gas from a coolant chamber tube is disclosed. The cap assembly having connecting means and outlet means extending from its side walls being generally shaped and sized for detachable mounting on the body of the cooling gas chamber tube. The cap assembly is also employed in a hot optical fiber process which is being cooled by helium.

14 Claims, 5 Drawing Sheets

SECTION A-A

CAP ASSEMBLY AND OPTICAL FIBER COOLING PROCESS

FIELD OF THE INVENTION

The present invention relates to the cooling of drawn fibers and particularly to the cooling of drawn optical glass fibers using a gaseous coolant. More particularly, the present invention relates to the use of a cap assembly for collecting cooling gas withdrawn from an optical glass fiber heat exchanger to minimize loss of coolant gas from the heat exchanger. The present invention also relates to the use of a cap assembly to supply gas to and withdraw gas from optical glass fiber heat exchanger.

BACKGROUND OF THE INVENTION

Optical fibers are conventionally made from glass rods or preforms having a central core of glass enveloped by a cladding of glass whose refractive index is lower than that of the glass core. The fiber is produced by heating the glass preform to softening temperature in a furnace and drawing the fiber from the softened preform. The fiber is rapidly cooled sufficiently to enable a protective coating of resin material to be applied to the surface of the drawn fiber. The cooling is carried out by drawing the fiber through a heat exchanger wherein it comes into contact with a gaseous coolant.

The gaseous coolant is continuously passed through the heat exchanger in a direction which is cross-flow, counter-flow, co-current-flow, or combination mode thereof relative to the direction of the movement of the glass fiber through the heat exchanger. The gaseous coolant transfers heat from the glass fiber to the walls of the heat exchanger which is cooled by the surrounding atmosphere and/or a cooling medium, usually water, which flows through passages in the heat exchanger. The gaseous coolant is generally helium although other gases or mixtures can be used. Helium is the preferred coolant gas because of its favorable heat transport properties and is safe to use. However, helium is costly relative to other gases so it is desirable to capture the helium and recycle it for reuse in the heat exchanger.

If the exhausted helium gas from the heat exchanger is vented to the atmosphere as what has been done in the current fiber production processes, the fiber production cost would be disadvantageously higher especially as the draw speed of fiber has kept increasing over the last 30 years. In order to reduce the fiber cost associated with helium use in the fiber cooling step, helium recovery systems and apparatuses have been proposed to recover the helium gas. Exhausted helium gas with contaminants such as air and moisture is evacuated from the heat exchanger and purified before being recycled back to the coolant gas feed stream to the heat exchanger.

However, these helium recovery systems suffer from one or more of the following drawbacks:(1) fiber vibration as a result of the ambient air flow at the fiber inlet or outlet where the helium is collected and vacuum is applied; (2) fluctuation in fiber diameters due to lack of control in the pressure, composition, and flow rate of the recovery system, which would negatively affects the fiber's mechanical and optical quality; (3) lower coolant (such as helium) purity and recovery due the ingress of air into the collected stream and egress of coolant (such as helium) from heat exchanger.

Air infiltration can be reduced significantly by ensuring there is a positive differential pressure between the cooling gas inside the heat exchanger and the surrounding environment. This has a disadvantage in that valuable helium will be lost to the environment through the fiber inlet end opening and/or fiber outlet end opening of the heat exchanger. Efforts have been made to minimize the amount of helium efflux and air influx through the fiber inlet end and outlet openings. For example, controlling the flow of helium into and out of the heat exchangers to limit air infiltration into the heat exchangers. However, operating heat exchangers at atmospheric or superatmospheric pressure results in significant loss of coolant gas from the system. A more economical processes for producing optical glass fiber are constantly sought.

The present invention provides a novel cap assembly for collecting the cooling gas with high purity and high recovery efficiency to reduce the cost of producing optical glass fiber without causing any negative impact on the fiber production process.

SUMMARY OF THE INVENTION

The present invention provides for a method of reducing the loss of gaseous coolant from an optical fiber cooling system by use of a cap assembly for collecting cooling gas from a heat exchanger. The cap assembly is designed to mount to the top, bottom or top and bottom of the heat exchanger and allow passage of the fiber through the cap assembly(s) and heat exchanger. The cap assembly also provides for at least one port means which can be used to supply or withdraw cooling and/or sealing gases depending on how and where the cap assembly is mounted on the heat exchanger. High coolant purity and recovery efficiency can be achieved with the device described in this invention without causing any negative impact on the fiber-drawing process and the air ingress and helium egress can be significantly minimized or even eliminated.

In one broad embodiment of the present invention, the invention comprises a method of cooling a hot drawn fiber in a heat exchange unit having one fiber inlet opening, one fiber outlet opening, at least one cooling gas inlet and at least one cooling gas outlet, and the cap assembly and a gas pumping means comprising the steps of passing the fiber through the heat exchanger, introducing gaseous coolant into the heat exchanger via at least one cooling gas inlet and withdrawing from the cap assembly via at least one gas outlet the collected helium stream mixed with contaminants which may be purified and recycled back into the coolant gas stream. Optionally, a sealing gas such as nitrogen, carbon dioxide, hydrogen, helium (purified or captured from the heat exchanger), argon, dry air or mixtures thereof may be introduced into the cap assembly thereby minimizing the infiltration of contaminants and egress of helium out of the heat exchanger.

DETAILED DESCRIPTION OF THE INVENTION

The present invention provides a cap assembly for collecting cooling gas from an optical fiber heat exchanger. The cap assembly outward shape may be square, rectangular, cylindrical or other shapes. The cap assembly consists of a fiber inlet end with an opening in its center, fiber outlet end with an opening in its center, side walls with port means to allow gas to flow through the side walls and a connecting means with an opening in its center which allows the cap assembly to be attached to the heat exchanger. The fiber inlet end, fiber outlet end and side walls form a hollow chamber. The cap is generally shaped and sized to be removable from the heat exchanger. However, the cap assembly could also be made as an integral part of the heat exchanger.

The cap assembly may be a one piece unit or may be designed in two or more pieces which can be hinged or not. The pieces can be opened or closed by a pneumatic cylinder, mechanical device or electrical means. The cap assembly is typically fabricated from a metal such as stainless steel or aluminum, although any suitable material can be used. The cap assembly may be designed such that the inner side walls are parallel or at a gradient from one end to the other end, forming a tapered shaped chamber. The inner side walls may also be curved in shape from one end to the other end.

Further, the fiber inlet end of the cap assembly may be flat or curved such as in a parabolic fashion. The port means in the side walls allows gas to flow into or out of the cap assembly chamber. These port means may be threaded such that a fitting leading to a pump mechanism may be attached thereto. The cap assembly itself will typically be mounted on the top or bottom or both top and bottom of the heat exchanger. The cap assembly is attached to the heat exchanger through the connection means. Typically, a sealant of some sort will be applied between the connection means and the fiber outlet end and the heat exchanger to eliminate loss of coolant gas from the interfaces as well as maintaining integrity of any vacuum or gas flow through the heat exchanger. The connecting means need not be situated between the fiber outlet end and the heat exchanger, it may be mounted to the side walls of the cap assembly and the sides of the heat exchanger, in which case the fiber outlet end would be mounted directly to the heat exchanger.

Figure 1:
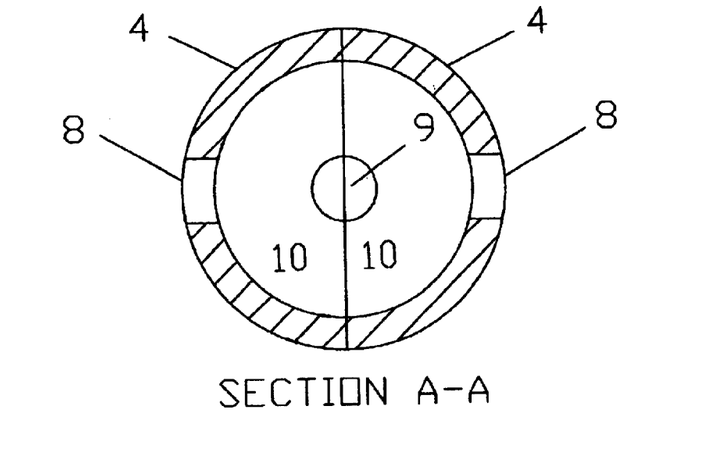
FIG. 1 is a schematic representation of a cap assembly.

The invention can be more easily understood by reference to the appended drawings. FIG. 1 is the cap assembly 1 which is shown mounted atop a heat exchanger 2. The hot fiber 3 being passed through both the cap assembly and the heat exchanger. Both the cap assembly 1 and heat exchanger 2 shown in FIG. 1 are made in two halves. Port means 8 extend radially through the side walls designated 4. The connecting means 11 mounts the cap assembly to the heat exchanger and has an opening 12 or a hole in its center, formed when the two halves are in contact with each other through which the fiber 3 passes through.

The fiber inlet end 5 has an opening 7, formed when the two halves are in contact with each other, in its center through which the hot fiber 3 passes. The fiber outlet end 6 has and opening 9, formed when the two halves are in contact with each other, in its center through which the fiber 3 passes. The openings are generally circular in shape but can be other shapes as well. The opening in connecting means 11 and fiber outlet end 6 is generally sized to be the same size and shape as the opening of the heat exchangers while the opening at the fiber inlet end 5 is generally smaller. FIG. 1 Section A—A shows the cap assembly having a circular shape, but the cap could be other shapes as well. Chamber 10 formed by the fiber inlet end 5, side walls 4, and fiber outlet end 6 may be of a different shape from that of the cap assembly when viewed from the top or sides.

Figure 2:
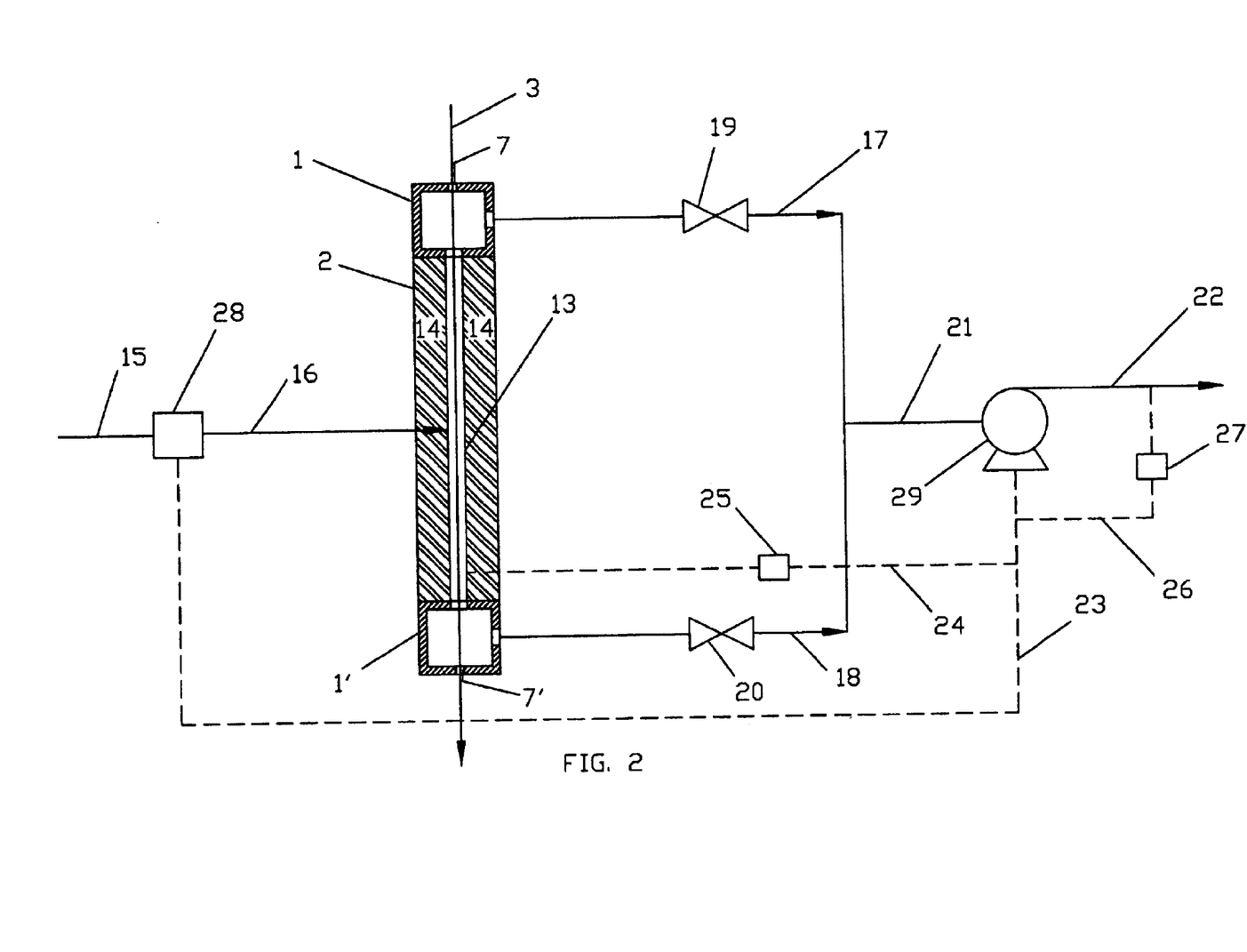
FIG. 2 is a schematic representation of a single unit recovery system to practice the process of the present invention, including the cap assembly.

FIG. 2 illustrated therein is an optic fiber cooling system including a heat exchanger 2, a gas flow controller 28 and a gas pumping means 29. In FIG. 2, cap assembly 1 is mounted on top of the heat exchanger 2 and another cap assembly 1' is mounted on the bottom of the heat exchanger 2. Heat exchanger 2 having a fiber cooling chamber 13, fiber inlet end, fiber outlet end and jacket 14. The heat exchanger is shown with glass fiber 3 being drawn though cap assembly 1, chamber 13 and cap assembly 1'. The fiber is drawn from a preform softened in a furnace, not shown in this illustration, positioned above the cap assembly 1. Coolant gas supply line 15 is connected to the inlet of gas flow controller 28. The outlet of flow controller 28 is connected via line 16 to heat exchanger 2.

A coolant gas withdrawal line 17 is connected to cap assembly 1 on the top of heat exchanger 2 while coolant gas withdrawal line 18 is connected to cap assembly 1' attached to the bottom of heat exchanger 2. Lines 17 and 18 are provided with flow control valves 19 and 20, respectively. At their downstream ends, lines 17 and 18 are connected to line 21 which in turn is connected to the suction end of pumping means 29. Exhaust gas discharge line 22 connects the discharge from pumping means 29 to a downstream gas purification plant. Heat exchanger 2, gas flow controller 28 and gas pumping means 29 are conventional equipment and details of their construction and operation form no part of the present invention.

The pumping means may be any pumping device suitable for removing gas from one point to another such as a variable speed gas blower or continuous speed gas blower. Although the location where line 16 enters chamber 13 is depicted as a single line connected to the center of chamber 13, line 16 may be positioned anywhere along the extent of chamber 13 or a plurality of such lines may be used to supply cooling gas to chamber 13. In a preferred arrangement, supply line 16 is positioned at the fiber outlet end of chamber 13 and a coolant gas discharge line 17 is positioned at the fiber inlet end of chamber 13 to provide coolant gas flow at a direction countercurrent to the direction of flow of fiber through chamber 13.

In the arrangement illustrated in FIG. 2, valves 19 and 20 can be used to shut off flow in either of lines 17 and 18 or they can be used to adjust the relative rate of flow of gas through lines 17 and 18. The speed control mechanism of pump 29 is connected to flow controller 28 through flow control loop 23 to chamber 13 via pressure control loop 24 which is provided with pressure transducer 25 and to line 22 via line impurity sensing loop 26 which is provided with a gaseous impurity sensor 27. Sensor 27 may be any device that can measure the concentration of a selective gaseous impurity. For instance, it may be an oxygen sensing device. Line 22 can lead to a gas purification system which is not shown. The gas purification system may be any gas purification system capable of separating the gaseous coolant used in the process from gaseous impurities that infiltrate the gas heat exchanger such as air, carbon dioxide and water vapor. Suitable gas purification units that remove the contaminants in the collected gas stream include pressure swing adsorption (PSA) units, temperature swing adsorption (TSA) units, permeable membrane separation units, cryogenic distillation plants, etc.

In the preferred embodiment, the gas purification system is a PSA plant which when used with the appropriate adsorbent efficiently and inexpensively removes gaseous impurities from the coolant gas. Considering the process in more detail, the first stage of the process is initiated by establishing flow of coolant through the heat exchanger. At this time, one or both of valves 19 and 20 are open with the valve openings adjusted to the desired extent. Next, an optical glass preform is heated to its softening point in a furnace positioned above the cap assembly 1. When the preform reaches the softening point, it begins to flow forming a fiber which is drawn into chamber 13 of heat exchanger 2 through cap assembly 1 via opening 7 and exits cap assembly 1' via opening 7'.

As the fiber passes downwardly through heat exchanger 2, it contacts the gaseous coolant flowing into chamber 13 through line 16. The gaseous coolant may be any gas that will not react with or otherwise adversely affects the quality of the optical fiber. Suitable coolant gases include such gases as helium, hydrogen, nitrogen, carbon dioxide and mixtures of these or other gases. The coolant gas preferably contains 60% or greater by volume of helium and more preferably at least 90% by volume of helium. Helium is preferred over other coolant gases because it is has favorable heat transport properties, is easily separated from other gases by conventional separation techniques, and is safe to use.

As the helium passes through chamber 13 of the heat exchanger 2, it cools the hot optical fiber thereby stabilizing the fiber and permitting it to be drawn out of cap assembly 1' through opening 7'. The cooled fiber is subsequently coated with a layer of resin and wound on a take-up spool. The warmed or spent helium is withdrawn from chamber 13 via cap assembly 1 through line 17 and via cap assembly 1' through line 18 when both lines are in service by blower 29 and preferably sent to a downstream processing system through line 22.

Since helium has a low density, it tends to flow upwardly as it passes through chamber 13. Accordingly, to optimize helium recovery and purity, it may be desirable to open valve 19 wider than valve 20 to accommodate the greater volume of helium in top of chamber 13. In some cases, it may be desirable to close valve 20 altogether and to use only line 17 to withdraw exhaust gas from the cap assembly 1.

To minimize loss of coolant gas, pumping means 29 withdraws gas from chamber 13 at a rate such that the pressure in at least part of chamber 13 at the coolant gas outlets of chamber 13 is substantially maintained below atmospheric pressure, usually between about 0.5 bara and atmospheric pressure, and preferably between about 0.7 bara and atmospheric pressure. The term "substantially maintain below atmospheric pressure" means that although the pressure throughout chamber 13 may rise above atmospheric pressure for short periods of time, it is maintained below atmospheric pressure in at least part of chamber 13 for at least about 90% of the time that helium is passed through chamber 13.

As indicated above, the gas separation unit can be any appropriate gas purification plant but is preferably a PSA system. It may comprise a single adsorption unit or a battery of adsorption units operated in phase or a plurality of adsorption units or batteries of adsorption units operated out of phase, whichever is desired. When a system comprising a single adsorption unit or battery of units all of which are operated in phase is used, the adsorption step must be periodically stopped to permit regeneration of the adsorbent beds, whereas when a plurality of adsorption units are employed in parallel and operated out of phase, one or more units can be an adsorption surface adsorbing impurities while one or more other units are undergoing regeneration to desorb the impurities. Operation of the adsorption systems of the invention is cyclical. In the preferred adsorption process, cycles are repeatedly carried out in a manner such that production of the purified helium is substantially continuous.

In a PSA system, the adsorption vessels are packed with an appropriate adsorbent and particulate form. Suitable adsorbents for the adsorption of nitrogen and oxygen includes zeolites such as zeolite 4A, zeolite 5A and zeolite 13X and carbon molecular sieves. In particular, adsorbents used in the adsorption process is a matter of choice and will be dictated in part by the nature of the impurities encountered in the coolant gas stream. The adsorption vessels desirably contain a pre-purification layer, desiccants such as activated alumina or silica gel to remove water vapor contained in atmospheric air. Activated alumina is a preferred desiccant since it also serves to remove carbon dioxide from the air thereby reducing or eliminating the adsorption of carbon dioxide by the principal adsorbent. Alternatively, the system may contain a separate air pre-purification unit to remove water vapor and carbon dioxide from the feed gas prior to its introduction into the adsorption vessels.

The temperature and pressure at which the PSA process is carried out are matters of choice and not critical. In general, the adsorbent process may be carried at temperatures in the range of about −50 to about 100° C. but are generally carried out at temperatures in the range of about 0 to about 40° C. Typically, the adsorption is carried out at a pressure at or above about 1 bara. The minimum pressure at which the adsorption step is carried out is preferably about 2 and most preferably about 5 bara. The upper pressure limit is determined by economics and limitations of the adsorption system and in general it is desirably about 50 bara, preferably about 20 bara and most preferably about 15 bara. The pressure at which adsorbent regeneration is carried out is likewise a matter of choice and the minimum pressure depends upon whether or not vacuum equipment is used to withdraw adsorbed gases from these vessels. Typically, the lower pressure limit during adsorbent regeneration of these vessels can be as low as 50 millibara but it is preferably not lower than about 150 millibara and it is most preferably not lower than about 200 millibara. Adsorbent regeneration may be carried out at pressures as high as 5 bara but is preferably carried out at pressures not higher than about 2 bara and most preferably at pressures not above 1 bara.

Figure 3:
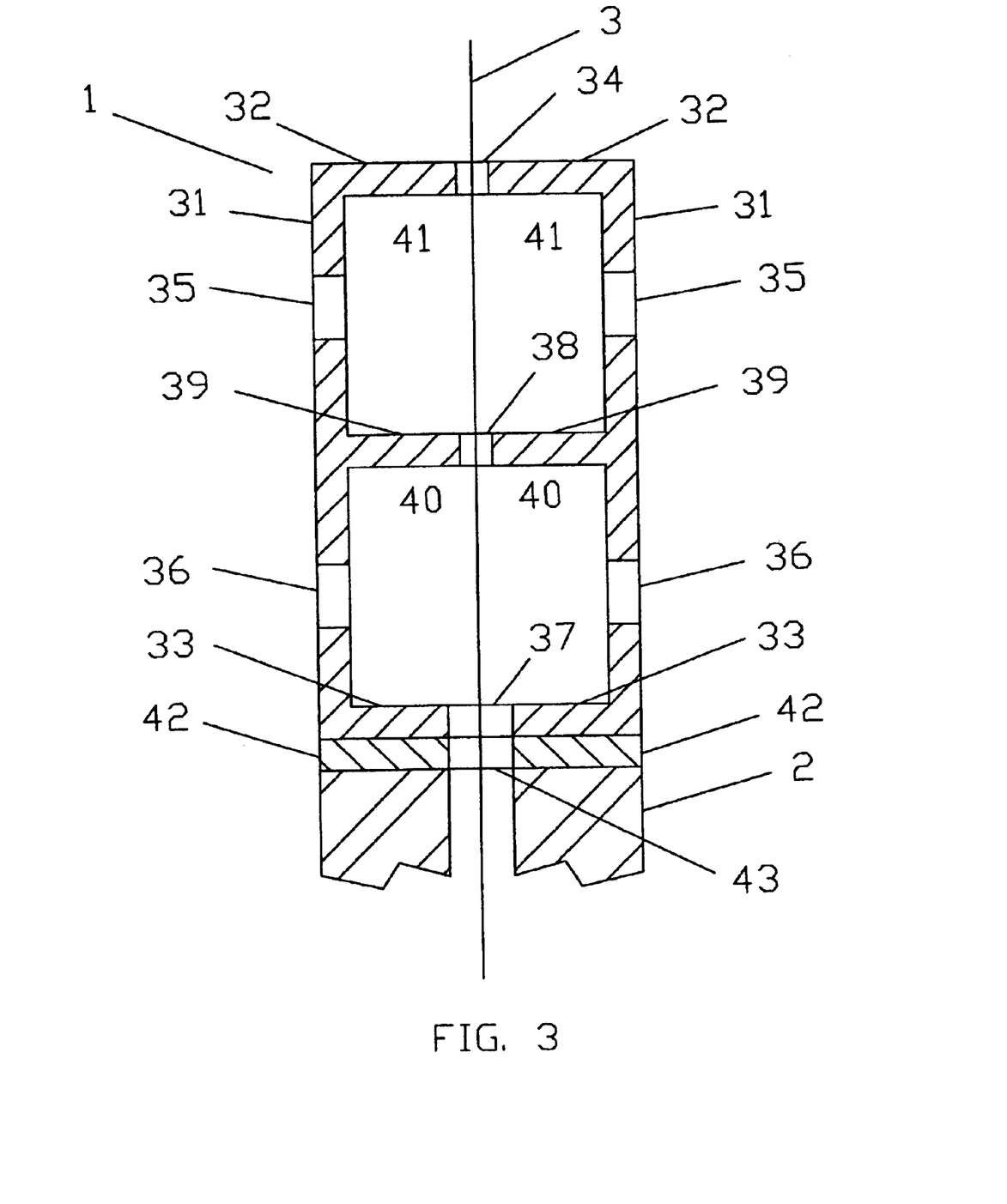
FIG. 3 is a schematic representation of a double-chambered cap assembly.

An alternative embodiment to the cap assembly is illustrated in FIG. 3. The cap assembly 1 is shown mounted atop a heat exchanger 2 wherein the hot fiber 3 is passed through both the cap assembly 1 and the heat exchanger 2. Port means 35 and 36 extend radially through the side walls designated 31. The connecting means 42 attaches the cap to the heat exchanger 2. Fiber inlet end 32 has an opening 34 in its center through which the hot fiber 3 passes. Fiber outlet end 33 has an opening 37 in its center through which the hot fiber 3 passes. In the embodiment, the cap assembly is divided into two distinct chambers 40 and 41 by partitions 39 in FIG. 3. The partitions 39 divide the cap assembly into two equally sized chambers or can be located so as to make two chambers of different sizes. It should be noted in the embodiments of both FIG. 1 and FIG. 3 that the single chamber or double chamber cap assembly may have one or more than one port means through which gas may be withdrawn or supplied. For instance, port means 35 in FIG. 3 could service as the supply port means for the sealing gas whereas the port means 36 can serve as the port means through which the cooling gas is withdrawn. Alternatively, the port means 35 could be blocked while port means 36 could be used to withdraw the gas from the cap assembly.

Although any gas can be used as a sealing gas for the cap assembly used on the top of the heat exchanger, it is preferred to take a portion of the collected gas and use it as the sealing gas. By doing so, a higher cooling gas concentration in the collected gas steam can be obtained. The chambers and partitions of the cap assembly can be fabricated separately and stacked together, which not only makes the fabrication and installation easier but makes modification of the coolant device more flexible. Each of the chambers and the size of the opening of the partitions can be tailored according to the geometry and operation conditions of the cooling device.

When the cap assembly is used at the bottom of the heat exchanger for capturing the cooling gas, the cap assembly will be attached to the cooling device in a position upside down from the one shown in FIG. 3, with port means 36 as the gas withdraw port means and port means 35 as the sealing gas supply port means. Alternatively, in the instance where the cooling gas is fed from the bottom, the cap assembly can be used as the feed chambers, in which both 35 and 36 will be served as supply port means. The cooling gas would be introduced to the cap assembly through port means 36 and sealing gas would be introduced to the cap assembly through port means 35.

Figure 4:
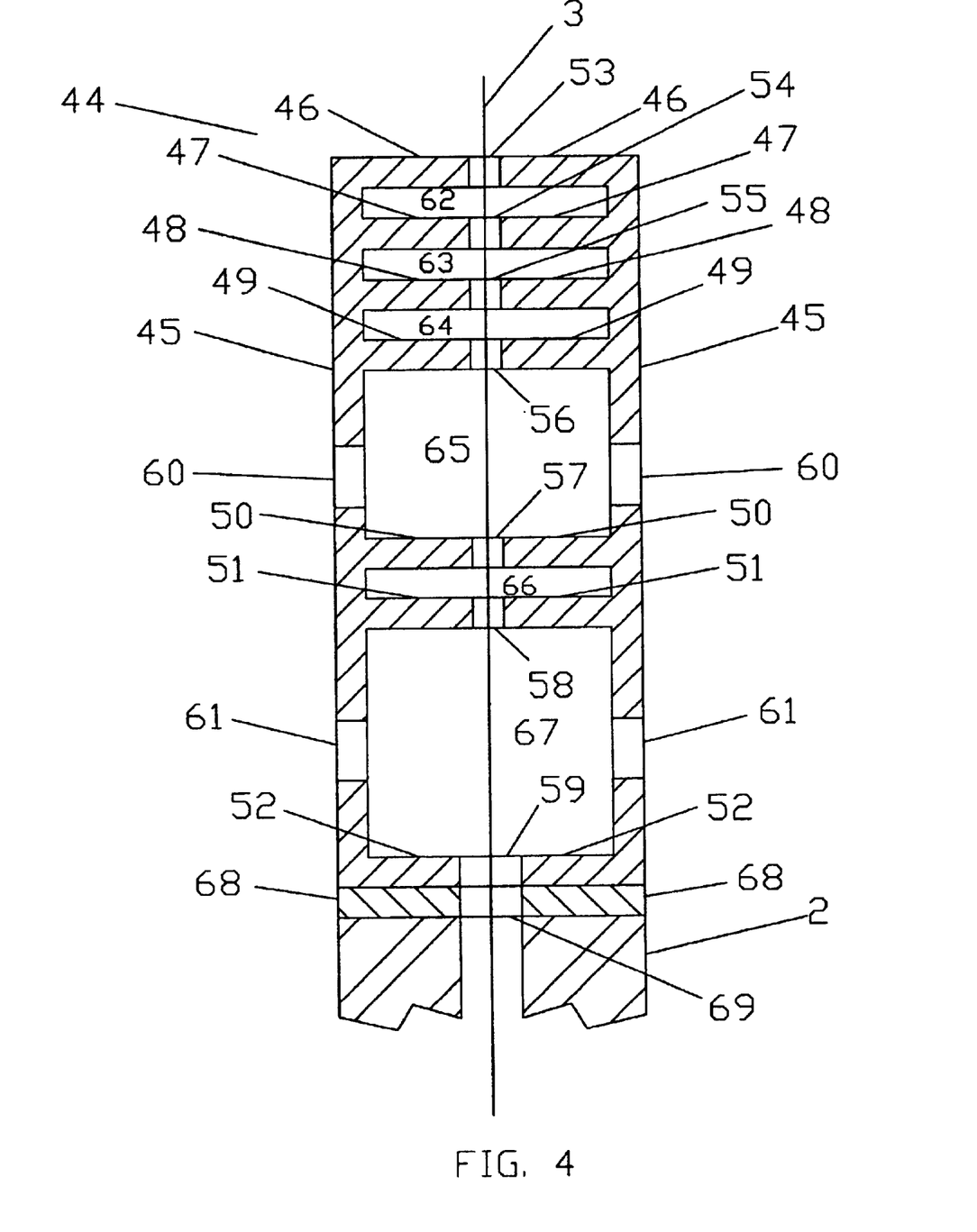
FIG. 4 is a schematic representation of a multi-chambered cap assembly.

Turning now to FIG. 4, which represents a multi-chambered cap assembly wherein more than two chambers are present in the cap assembly. FIG. 4 shows two port means 60 and 61 but there may be as few as one port means or each chamber may have its own port means. This cap assembly designated as 44 is shown mounted on the top of the heat exchanger 2 or it could be mounted on the bottom of the heat exchanger in a position upside-down from that shown in FIG. 4. The hot fiber 3 is shown passing through both the cap assembly and the heat exchanger 2. Port means 60 and 61 extend radially through the side walls designated 45. Connecting means 68 connects the cap assembly to the heat exchanger 2. Again, the fiber inlet end 46 has an opening 53 in its center through which the hot fiber 3 passes. Fiber outlet end 52 has an opening 59 it its center through which hot fiber 3 passes. In the multi-chambered cap assembly multiple chambers 62–67 are formed by partitions 47–51. Each chamber may have its own port means (e.g. 60 and 61). The partitions that are used to form the chambers each have an opening (54–58) in their center similar to opening 53 which allows the fiber to pass through them. FIG. 4 shows a cap assembly with several chambers but the number of chambers may be reduced or increased.

As in the single chamber cap assembly and dual-chamber cap assembly, the port means 60 and 61 may serve as either an inlet or outlet for gases. Thus, in a multi-chambered cap assembly port means 60 and 61 could be used to supply gases to the cap assembly when mounted on the bottom of the heat exchanger assembly. When the cap assembly is mounted on the top of the heat exchanger assembly port means 60 and 61 may be employed, one for supplying sealing gas, the other for withdrawing cooling gas from the multi-chamber cap assembly. Again, one or more than one of the inlet/outlet means (such as 60 and 61) may be employed in the cap assembly.

It should be noted that, although the side walls, partitions, fiber inlet end and fiber outlet form the chamber(s) in the cap assembly shown in FIGS. 1, 3, and 4 are flat and/or parallel to each other, they can be in any shape and orientation to facilitate the gas flow inside the cap assembly and eliminate or minimize any negative impact on the fiber drawing process.

Some of the key features and advantages of the cap assembly described in the invention is described below with regard to the design of the assembly and the operation of the fiber-drawing/cooling process. It should be emphasized the geometry and the operation of the assembly is critical to the recovery system and the fiber drawing process. For example, a fiber-cooling heat exchanger where the helium is supplied to the heat exchanger from the bottom and exhaust gas is coming off from the top is discussed.

Compared to a heat exchanger not using any device for coolant recovery, the assembly provides a mean to redirect the flow of the used coolant gas from the heat exchanger. Instead of coming off upward from the fiber inlet at the top, the used coolant gas can be redirected to flow in a radial direction perpendicular to the fiber. The change in direction of the flow of the gas coming off the heat exchanger prevents the particles in the ambient from being blown into the furnace located above the heat exchanger and contaminating the preform and the fiber being drawn.

There are practices in a helium recovery system where helium is withdrawn directly from the heat exchanger. In those cases, the space where the exhaust gas is taken out from is relatively narrow, especially for heat exchangers with a small diameter cooling chamber tube. Thus, deeper vacuum is usually required to withdraw the spent gas stream, otherwise a significant portion of the spent gas would be lost from the fiber inlet. Deeper vacuum tends to disrupt the fluid flow pattern and pressure profile in the heat exchangers cooling chamber tube, which would result in disrupting the drawing process and reducing the cooling efficiency (or increasing helium coolant usage). If the assembly described in this invention is used, the pressure drop in the assembly is small compared to that in the helium passage inside the heat exchanger. Therefore, spent helium can be collected at a relatively lower vacuum without disrupting the process. To reduce the air intake from the fiber inlet, one can use a double or multiple chamber assembly, where a portion of the collected gas or other gases can be introduced as a sealing gas to the upper chamber of, for example, a double chamber assembly. The sealing gas flow is adjusted according to the coolant feed flow and the vacuum applied to the spent gas collection chamber. Optionally, one or more chamber(s) can be included between the withdrawal and the sealing gas to optimize the flow pattern and pressure profile in the assembly.

The design of the assembly geometry and the orientation of the port means of the withdrawal chamber can be tailored to minimized the impact of gas flow inside the assembly on the fiber such as fiber vibration. For instance, gas distributor, baffles or porous tube can be put inside the assembly.

In many commercial heat exchangers, the coolant is fed from the bottom through a single-chamber feed assembly. An iris plate is usually attached to the bottom of the feed assembly to restrict the egress of the coolant from the feed chamber. The diameter of the opening of the iris plate is quite small (usually between 1 and 5 mm), the gas velocity at the iris plate can reach 50 meters per second or higher, depending on the feed flow rate, cooling chamber tube diameter and length of the cooling chamber tube, as well as the iris diameter. The high gas velocity through the iris plate could cause fiber vibration, which would result in fiber breakage and affect the fiber quality.

Another problem associated with the iris plate design is the percentage of the coolant lost from the bottom increases with the decrease of feed flow and can not be conveniently adjusted for varying flow rates. By using a double- or multiple-chambered assembly on the bottom of a heat exchanger while feeding coolant to the upper chamber and sealing gas to the bottom chamber of a, for instance, double-chambered assembly the coolant gas loss through the fiber outlet can be greatly reduced and the sealing gas flow can be adjusted according to the feed flow. In addition, the size of the opening of the fiber outlet at the bottom chamber can be made larger than the opening of an iris plate that would be used without the expense of losing coolant from the bottom. By doing so, the linear velocity at the fiber outlet is reduced and thus the chances of fiber vibration caused by the high flow velocity is greatly reduced.

If helium is collected directly from the heat exchanger or from a single-chambered helium collection assembly, the helium recovery and helium purity can not be independently changed. Generally speaking, vacuum pressure in the withdrawal chamber assembly should be kept at relatively constant to minimize the disturbance to the fiber drawing process. Adjusting the sealing gas flow rate allows one to maintain the coolant purity of collected gas stream.

The invention will now be demonstrated by the following examples which should be construed as exemplary of the present invention and not necessarily limiting.

EXAMPLES

Example 1

The purity of the helium collected and the air ingress flow rate for a single and double chambered cap assembly are shown in Table 1. When the length of the channel where the fiber enters the cap assembly is increased from 0.25 inches to 1 inch, the helium purity increases from 46% to 53%. Meanwhile, the air ingress flow rate is reduced from 16.9 SLPM to 15.7 SLPM due to the extra length of the channel offers more resistance to air ingress.

TABLE 1

Helium purities in the collected coolant gas stream and the air ingress flows

| numbers of chambers | Single-chamber | | Double chamber | |
| --- | --- | --- | --- | --- |
| | top inlet channel length = 0.25 inch | top inlet channel length = 1 inch | volume ratio top/bottom = 1:2 | volume ratio top/bottom = 2:1 |
| Helium purity, % | 45 | 63 | 68 | 69 |
| Air ingress, SLPM | 16.9 | 15.7 | 8.1 | 6.1 |

As shown in Table 1, a double chambered cap assembly design gives a higher helium purity than obtained with a single chambered cap assembly design. By reducing the collection chamber volume and increasing the buffer chamber volume, the helium concentration is increased from 65% to 69% and air ingress drops from 8.1 SLPM to 6.1 SLPM. The employment of a sealing gas for each doubled chambered cap assembly used on both the top and bottom of the heat exchanger could reduce the coolant loss and air ingress further improving the systems efficiency

Example 2

Helium recovery collection test was conducted on a heat exchanger of a 15-meter-high optical fiber draw tower. A double-chambered cap assembly was attached to the bottom of the heat exchanger (or the cooling device). Helium was used as the coolant gas, which was fed to a cap assembly on the bottom of the heat exchanger. The heat exchanger has a inner channel diameter of 10 mm and a height of 2 meters. The diameter of the openings in the cap assemblies through which the optical fiber passed was 3 to 5 mm. The fiber draw speed was varied from 3 to 20 meters per second. The helium feed flow rate, which was changed according to the fiber draw speed, varied between 0 to 100 liter per minute. The upper chamber, where the fiber enters the cap assembly was used as the helium feed chamber and the lower chamber where the fiber leaves the cap assembly was used as the sealing gas chamber. Dry air was employed as the sealing gas. Another cap assembly was used on the top of the heat exchanger. Both single- and double-chambered cap assembly were tested as the coolant collection cap assembly. In the case where double-chambered cap assembly was used on the top of the heat exchanger, exhaust coolant was withdrawn from the outlet means connected to the chamber at the fiber outlet end while the sealing gas (which was from the collected helium stream) was fed to the chamber at the fiber inlet end. The sealing gases feed to the top and bottom cap assemblies were adjusted to maximize the helium recovery efficiency.

Turbulent flow in the heat exchangers cooling chamber tube and the cap assembly could cause low amplitude vibrations in the fiber when the drag of the upward flow becomes greater than the fiber tension due to the drawing. Fiber vibration could result in the fiber bending or twisting contributing to attenuation in the optical fiber. When the vibrations become too large, the fiber could hit the walls of the heat exchanger causing cuts or breaks. No fiber vibration was observed in a wide range of vacuum levels between 0 and 14 inches water gauge (IWG), which is measure at the suction side of the vacuum pump.

In the fiber drawing operation, the helium flow rate was adjusted based on outer diameter of the coated fiber. A smaller coated fiber diameter than the specified value indicated that a higher cooling capacity was required and thus the helium flow rate was raised accordingly.

The effect of helium collection on the cooling efficiency was studied by measuring the coated fiber diameter with and without helium recovery system being used.

The fiber diameter measurement shows the helium collection system does not reduce the cooling efficiency of the optical fiber heat exchanger. Therefore, helium demand will not increase as a result of the addition of the helium recovery system.

Figure 5:
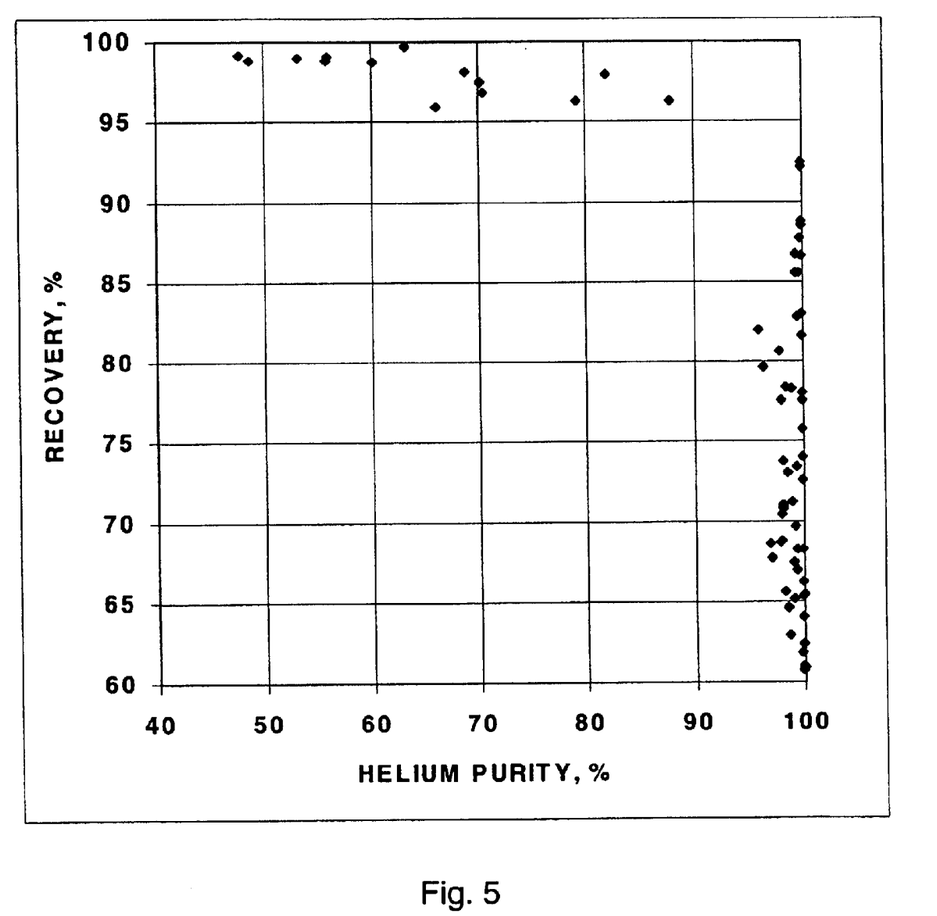
FIG. 5 is a plot of helium recovery efficiency versus helium purity in the collected gas steam.

FIG. 5 shows the helium purities and collection recoveries of the collected gas stream at different operating conditions (i.e., vacuum levels, feed flow rate, sealing gas flow rate, and fiber draw speed). The collection recovery is the amount of helium collected by the collection device as a percentage of helium fed into the heat exchanger.

As one can see from the figure, helium recovery up to 80% to 90% and purity of the collected helium stream of 97% to 99% were obtained. Generally speaking, higher helium recovery was observed at lower helium purity. The high helium purity achieved in the given example suggests the possibility of direct recycle of helium without further purification, which greatly reduces the capital cost of the helium recovery system. However, the inclusion of purification processes such as PSA, TSA, membranes will improve both helium recovery and purity. The selection of the system should be determined based on the magnitude of helium flow rate, the types of draw tower and heat exchanger, as well as the fiber-drawing operation.

As the vacuum level was increased, the purity of the collected gas was decreased because more contaminates were drawn into the collected gas stream. On the other hand, as the vacuum level was increased the amount of helium recovered increased thus reducing the amount of helium lost.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit of the present invention.

What is claimed is:

1. A method of cooling a hot drawn fiber in a heat exchange unit comprising a single heat exchanger having one fiber inlet end opening, one fiber outlet end opening, at least one cooling gas inlet, gas pumping means and a cap assembly having at least one inlet and at least one outlet comprising the steps:
   a) drawing said fiber through said heat exchanger;
   b) introducing gaseous coolant into said heat exchanger via said at least one cooling gas inlet;
   c) collecting said cooling gas in said cap assembly; and
   d) withdrawing a gaseous exhaust stream comprising said gaseous coolant and at least one gaseous impurity from said cap assembly by means of said gas pumping means.

2. The method as claimed in claim 1 wherein said fiber is optical glass fiber.

3. The method as claimed in claim 1 wherein the gaseous coolant introduced in the said heat exchanger comprises helium, nitrogen, carbon dioxide, hydrogen and mixtures thereof.

4. The method as claimed in claim 1 wherein said gaseous exhaust stream is withdrawn from said cap assembly at a rate such that the pressure and at least part of said heat exchanger is maintained between at about 0.7 bara and ambient pressure.

5. The method as claimed in claim 1 wherein the gaseous coolant introduced into said heat exchanger comprises at least 60% helium.

6. The method as claimed in claim 1 wherein said at least one gaseous impurity comprises air.

7. The method as claimed in claim 1 wherein the rate of withdrawal of said gaseous exhaust stream from said heat exchanger through said cap assembly is partially determined by the rate of flow of gaseous coolant into said heat exchanger.

8. The method as claimed in claim 1 wherein said fiber is drawn through said heat exchanger and said gaseous coolant is introduced into said heat exchanger at substantially constant rates.

9. The method as claimed in claim 1 further comprising removing at least part of said at least one gaseous impurity from said gaseous exhaust stream and recycling the impurity depleted gaseous exhaust stream to said heat exchanger as gaseous coolant.

10. The method as claimed in claim 1 wherein the removal of at least part of said at least one gaseous impurity for some gaseous exhaust stream is carried out by a gas purification process selected from the group consisting of pressure swing ad sorption, temperature swing adsorption, membrane separation, distillation and combinations of these processes.

11. The method as claimed in claim 10 wherein said gas purification process is a pressure swing adsorption process using a nitrogen and oxygen selective adsorbent.

12. The method as claimed in claim 1 wherein one or more cap assemblies are present on said heat exchanger.

13. The method as claimed in claim 1 wherein a cap assembly is present on both the top of the chamber and bottom of said heat exchanger.

14. The method as claimed in claim 1 wherein at least two cap assemblies are present on said heat exchanger.

* * * * *